April 30, 1929.  S. H. H. PARSONS  1,711,126
CABLE ADJUSTING DEVICE FOR STEERING QUADRANTS
Filed May 19, 1928  2 Sheets-Sheet 2
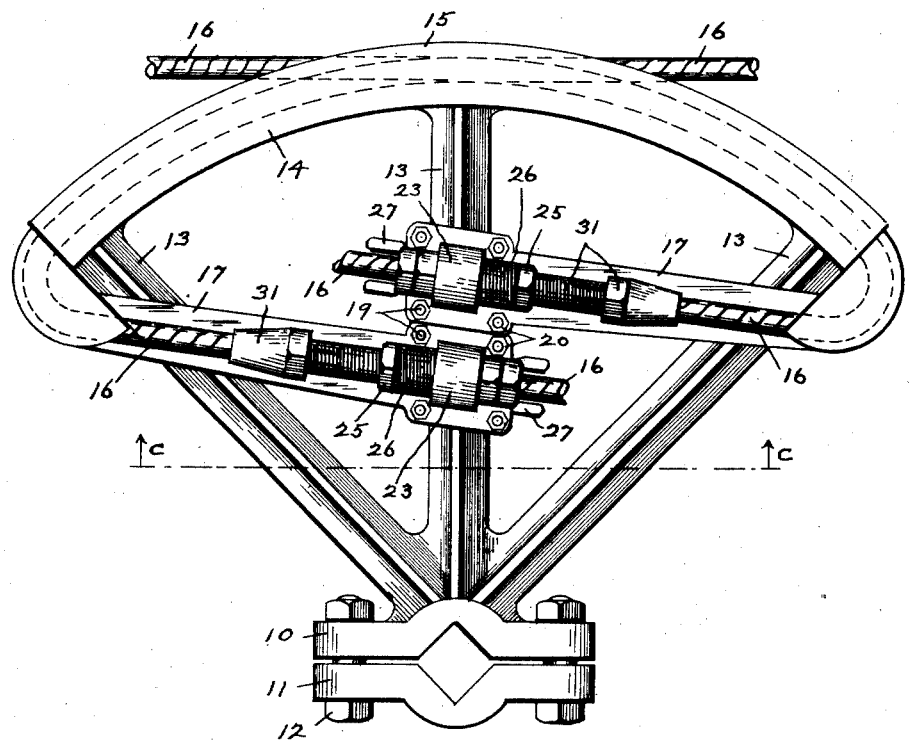
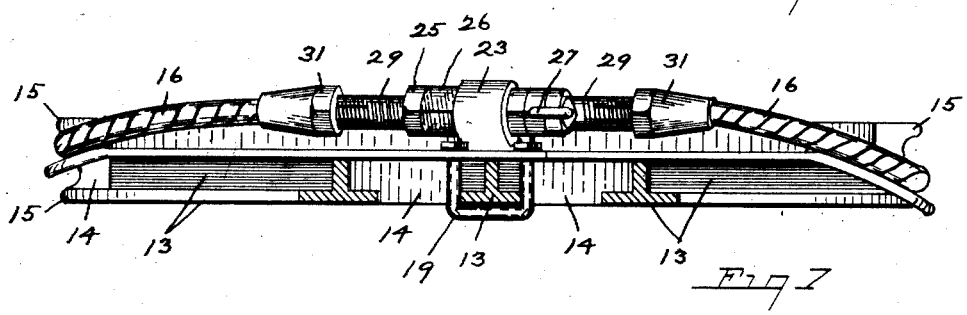
INVENTOR.
Sylvanus H. H. Parsons.
BY
ATTORNEYS Patented Apr. 30, 1929.

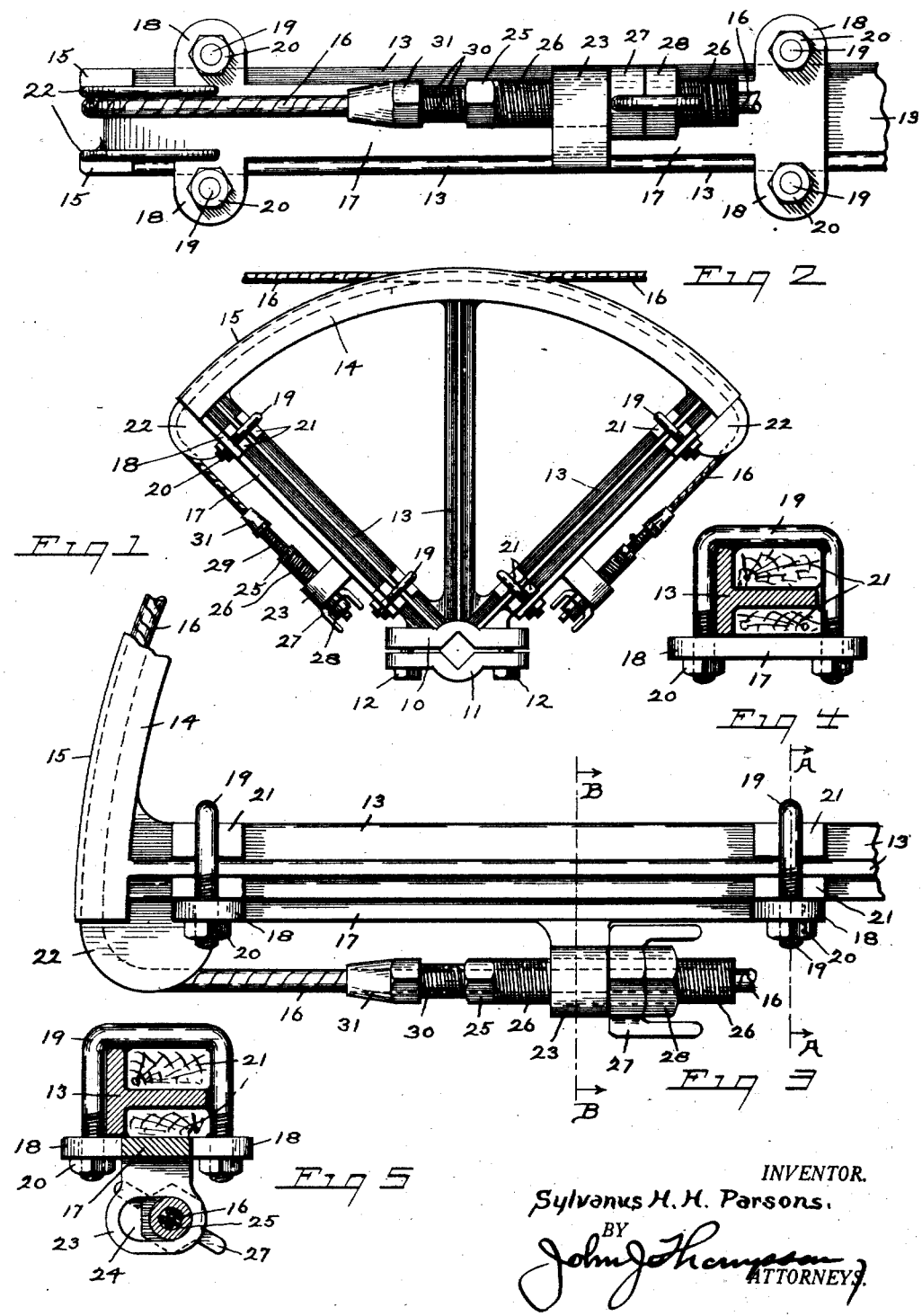

1,711,126

UNITED STATES PATENT OFFICE.

SYLVANUS H. H. PARSONS, OF POUGHKEEPSIE, NEW YORK.

CABLE-ADJUSTING DEVICE FOR STEERING QUADRANTS.

Application filed May 19, 1928. Serial No. 279,166.

This invention relates to a marine steering quadrant, and more particularly to that class where means is provided to adjust the length of the steering cables which have their ends attached thereto.

It is now the general practice in the installation of steering gears on vessels to attach or mount a quadrant upon the upper end of the rudder post, and from this quadrant to run two steering cables through proper guide blocks or pulleys to a drum attached to the steering post; the ends of said cables being secured to said quadrant by threading the ends through holes in line with the grooves in the periphery of the quadrant, and either forming a knot therein or placing a clamp thereon to prevent the withdrawal of the cable through the holes; and to make any adjustment in the length of the cables caused by stretch, a turnbuckle is placed in the cables near the quadrant, which is not easily gotten at as the quadrant is mounted under the decking in a small space, and can not be readily gotten at.

The object of the present invention, is to provide either a steering quadrant embodying an adjustable clamping means for the steering cables, or such an adjustable clamping means that may be attached to steering quadrants which are now in use, thus providing them with the take-up feature.

Another object of the invention is to provide an adjustable take-up cable clamp, that shall be simple, contain few parts, afford a positive grip for the end of the cable, and be easily adjusted in a small space and without the use of special tools.

Still a further object being to provide a cable take-up means that can be attached to the arms of a steering quadrant, irrespective of the shape or form of cross section of said arms or spokes.

A further object of the invention is that a single cable may be employed on each side of the boat, leading from the steering gear to the quadrant, and no splices or turnbuckles are required; and also that the cable may be renewed without splicing, and as the device is tubular, the cable may be threaded therethrough and the slack taken up before the same is clamped.

With these and other objects in view, my invention consists in certain novel construction and combination of parts as will hereinafter be described and claimed, and illustrated in the accompanying drawings, in which like figures of reference refer to corresponding parts in all of the views, but it is understood that slight changes may be made without departing from the spirit of the invention.

In the drawings:—

Figure 1 shows the upper side of a quadrant with the cable take-up means attached thereto.

Figure 2 shows an enlarged view of one of the spokes, illustrating the method of attaching the cable take-up to the spoke of the quadrant.

Figure 3 shows a partial enlarged view of the same.

Figure 4 is a cross sectional view of the spoke and cable take-up device, taken on the line A—A of Figure 3.

Figure 5 is a cross sectional view of the same, taken on the line B—B of Figure 3.

Figure 6 shows a modified form of the device, in which the adjusting means is attached to the center spoke.

Figure 7 is a sectional view of the same taken on the line C—C of Figure 6.

Referring to the drawings—

The usual form of steering quadrant is indicated, and comprises the hub 10, provided with the cap 11, held in place by the bolts 12; and radiating therefrom are the spokes 13, which are here shown as T-shaped in cross section, but which may be of any desired shape; and to the outer ends thereof is formed a rim or sector 14, which is provided with the flanges 15, for the steering cables 16.

The cable take-up or adjusting means, comprises a plate 17, which is provided with the lugs or ears 18, projecting from the sides thereof, and formed with holes for the reception of the ends of the U-bolts 19, which embrace the spoke 13, and secure the plate 17 to said spoke 13 by the nuts 20; while the wooden filler blocks 21 are provided as shown in Figure 4; the shape of these filler blocks being determined by the form of the spoke; that is, if a round spoke was used, the blocks 21 would have to be concave to fit the same.

The outer end of the plate 17 is provided with a rounded portion 22, to provide an easy turn for the cable 16, as said cable must not only be properly supported for the right angle bend required, but must be capable of being easily drawn to adjust its length.

Near the other end of said plate 17, there is formed or otherwise attached, a lug 23, which is formed with hole 24, which is elongated in cross section (see Figure 5) for the purpose of alinement of the cable clamping means.

The cable clamping means as here shown, comprises a tubular member 25, which is mounted within said lug 23, and which is provided with the external threads 26, upon which are threaded the wing nut 27 and the locking nut 28.

The other end of said tubular member 25, is reduced in diameter at 29; slotted at 30 to form a collet, and provided with the taper threads 31 and a taper nut 32; the object being to pass the end of the steering cable 16 through the same; secure the cable to the member 25 by said collet, and adjust the position of the same with regard to the lug 23 and plate 17 by the nuts 27 and 28.

While this form of cable securing means is here shown, it is to be understood, that any suitable means may be employed for securing the end of the cable to the adjusting device, such as a turnbuckle.

It will be noted that the groove in the rim of the quadrant and the groove in the block or rounded portion 22, and the hole in the lug 23 are the width of two cables; this being necessary for the reason that the cables run in opposite directions and must freely pass each other; thus one cable is above the other, and the adjusting member 25 for one cable will be to one side of the hole 24, and for the other cable will be to the opposite side of said hole 24, thus alining with the cables.

It is also to be noted, that while the device is here shown in the form of an attachment, which may be secured to any of the usual types of marine steering quadrants, that in many cases, it will be found to advantage, to form the rounded portion 22 and the lug 23 integral with the spoke 13 of the quadrant.

Referring to the modified construction illustrated in Figures 6 and 7, the plate 17, in place of being secured to the outer side of one of the side spokes 13, is secured on the face of the center spoke 13, by the U-bolts 19 and nuts 20; said plate 17 being formed with the rounded portions 22, but said portions 22 are curved as shown in Figure 7, to allow the cable 16 to be brought upward to the level of the device as shown.

Having thus described my invention, what I claim as new and desire to secure by Letters Patent, is:—

1. In a cable adjusting means for a steering quadrant, and in combination with a steering cable, of an adjusting means comprising a cable guide and a lug adapted to be secured to said quadrant, clamping means adapted to secure said cable, and means for adjustably securing said cable clamping means to said lug for the purpose of adjusting the length of the cable.

2. In a cable adjusting means for a steering quadrant, and in combination with the steering cable, of a plate adapted to be secured to the quadrant in a rigid manner, a cable guide formed on one end of said plate for guiding the bend of said cable, a lug formed on said plate, a tubular member slidably mounted in said lug, a cable gripping member secured to said cable and to said tubular member, and means for adjusting said tubular member within said lug for the purpose of varying the length of said cable.

3. A cable adjusting device for quadrants, comprising in combination with a cable, of a clamping member secured to said cable, and adjusting device secured to said quadrant and means for adjustably securing said clamping member to said adjusting device, comprising a threaded member, a lug formed on said adjusting device and adapted to receive said threaded member, and nuts threaded thereon and in contact with said lug, for adjusting and locking said threaded member with respect to said lug.

In testimony whereof I affix my signature.

SYLVANUS H. H. PARSONS.